3,726,823
COMPOSITION FOR PREVENTING THE STICKING OF OILY PRINTING INK TO A SURFACE OF THE CYLINDER OF OFFSET PRINTING PRESS
Tsuyoshi Morishima and Rentaro Shimizu, Tokyo, Japan, assignors to Kabushiki Kaisha Ricoh, Tokyo, Japan
No Drawing. Continuation-in-part of application Ser. No. 860,409, Sept. 23, 1969. This application Nov. 15, 1971, Ser. No. 199,042
Int. Cl. C08f 29/34
U.S. Cl. 260—29.6 M          6 Claims

ABSTRACT OF THE DISCLOSURE

A composition containing polyacrylic acid, colloidal silica, phosphoric acid and an organic compound of titanium such as a chelate compound of titanium or an organotitanium compound in a mixture of water and an organic solvent, said composition being applied to a surface of the metallic cylinder of an offset printing press to prevent said cylinder surface from being stained with oily printing ink and to avoid contamination of the printed matter with said printing ink.

BACKGROUND OF THE INVENTION

Field of the invention

The present invention relates to a composition comprising polyacrylic acid, colloidal silica, phosphoric acid and an organic compound of titanium such as a chelate compound of titaninum or an organotitanium compound.

Description of the prior art

A composition for preventing the sticking of oily printing ink to a metallic surface has not been disclosed.

It is therefore, an object of this invention to provide a novel composition for preventing the sticking of oily printing ink to a metallic surface.

This application is a continuation-in-part of copending application Ser. No. 860,409 filed Sept. 23, 1969, and now abandoned.

SUMMARY OF THE INVENTION

The present invention relates to a composition which is applied to a surface of the metallic cylinder of an offset printing press to prevent said cylinder surface from being stained with oily printing ink and to avoid contamination of the printed matter with said printing ink.

In a small-sized offset printing press in which the printing is carried out by utilizing a master paper mounted on the surface of the cylinder of said printing press, the master papers are smaller in size than the regular size, i.e. a smaller area than that of the cylinder surface is often used. In this case, the printing ink will stick to the area of the cylinder surface not covered with the master paper (i.e. the exposed area of the cylinder surface) and this printing ink will contaminate the blank space of the printed matter.

As above stated, the object of this invention is to provide a composition to prevent the sticking of the printing ink to the cylinder surface.

The composition of this invention is a dispersion comprising polyacrylic acid, colloidal silica, phosphoric acid and an organic titanium compound such as a chelate compound of titanium or an organotitanium compound. This dispersion may be prepared by mixing an aqueous solution of polyacrylic acid, colloidal silica and phosphoric acid and a solution of an organic compound of titanium in an organic solvent.

Suitable polyacrylic acids used in this invention are water-soluble polymers of acrylic acid, said polymers having a molecular weight of from about 7,000 to 200,000. Typical and suitable polyacrylic acids are sold under trademarks of Aron A–10 (H) and Aron A–20 LL by Toagosei Chemical Industry Co., Ltd. in Japan.

The colloidal silica is a colloidal silicic acid solution containing 20% by weight silicic acid in water. Such colloidal silica can be prepared by passing water glass through an ammonium type cation-exchange resin or by ion-exchanging water glass with a weakly acidic cation-exchange resin at a pH of more than 8 and a temperature of from 60° C. to 100° C. Suitable procedures for preparing the aforesaid colloidal silica materials are disclosed in U.S. Pats. Nos. 2,457,971, 2,631,134, 2,650,200 and 2,727,088. Such colloidal silica products are sold under the trademarks Snowtex–30, Snowtex–C, Snowtex–N and Snowtex–O by Nissan Chemical Industries Co., Ltd. in Japan.

Suitable chelate compounds of titanium include water-soluble or alcohol-soluble compounds and they include (1) diisopropoxy - bis(acetylacetonato)titanium, (2) diisopropoxy - bis[2 - (N,N - dihydroxyethylamino)ethoxy] titanium, (3) titanium - bis(acetylacetonato)diphenolate, titanium - bis(acetylacetonato)di - o - hydroxyphenolate and titanium - bis(ethyllactato)diphenolate.

Suitable organotitanium compounds include tetramethoxytitanium, tetraethoxytitanium, tetra - n - propoxytitanium, tetra-isopropoxytitanium, tetrabutoxytitanium and bis(cyclopentadienyl) titanium diphenyl.

As solvents for said organic compounds of titanium, organic solvents having a low boiling point such as methyl alcohol, ethyl alcohol, isopropyl alcohol, or acetone and the like, may be suitably used.

The aforementioned ingredients of the compositions of the present invention have the following functions. Polyacrylic acid is useful for the application of the composition to the cylider surface and the formation of a film. The organic compound of titanium changes the cylinder surface from one having a hydrophobic (oleophilic) effect to one having a hydrophilic (oleophobic) effect and increases the adhesion of the film to the cylinder surface. Colloidal silica is effective for controlling the stickiness of the film and facilitates the removal of the printing ink from the cylinder surface. Phosphoric acid acts as a corrosion inhibitor.

Accordingly, a film capable of preventing the sticking of the printing ink may be formed on the cylinder surface by applying thereto the composition comprising the abovementioned ingredients.

The compositions of this invention comprise a formulation having the following ingredients:

| | Parts by wt. |
|---|---|
| An aqueous solution containing polyacrylic acid (molecular weight of about 7000~200,000, and a solid content of about 25% | 0.2–5 |
| Colloidal silica (20% by weight silicic acid solution in water) | 1–5 |
| Orthophosphoric acid | 0.5–10 |
| An organic compound of titanium | 0.1–2 |
| Organic solvent | 40–75 |
| Water | 58.2–3 |
| Total | 100 |

The compositions of this invention are very effective when applied to cylinders made of cast iron or anodic oxidation treated aluminium, and are applied to the surface of the cylinder before the master paper is mounted thereon or to the surface area of the cylinder which is not covered with the master paper.

DESCRIPTION OF THE PREFERRED EMBODIMENTS

The present invention is further illustrated by the following non-limitative examples.

Example 1

An aqueous solution (A₁) was prepared from the following ingredients:

| | Parts by wt. |
|---|---|
| Polyacrylic acid (Aron A-10(H)) (molecular weight 150,000 and solid content 25%) | 1 |
| Colloidal silica (Snowtex-30) (20% by weight silicic acid solution in water) | 1 |
| Orthophosphoric acid | 5 |
| Water | 22.5 |

A second solution (B₁) was prepared from the following ingredients:

| | Parts by wt. |
|---|---|
| Diisopropoxy-bis(acetylacetonato)titanium | 0.5 |
| Isopropyl alcohol | 70 |

A composition of this invention was prepared by mixing the solutions of (A₁) and (B₁). This composition was applied to the surface of a cylinder of an offset printing press, said cylinder being made of an aluminium alloy having corrosion resistance, and dried at room temperature for five minutes. The cylinder thus treated was not stained with oily printing ink and consequently a clear printed matter was obtained, even when the printing was carried out by using a master paper of smaller size than that of cylinder surface. The oily printing ink is the one prepared by dispersing dyestuff or pigment in a drying oil.

Example 2

An aqueous solution (A₂) was prepared from the following ingredients which are the same as those used in Example 1.

| | Parts by wt. |
|---|---|
| Polyacrylic acid (Aron A-10(H)) | 5 |
| Colloidal silica (Snowtex-C) | 5 |
| Orthophosphoric acid | 10 |
| Water | 14.8 |

A second solution (B₂) was prepared from the following ingredients:

| | Parts by wt. |
|---|---|
| Titanium-bis(ethyllactato)diphenolate | 0.2 |
| Methyl alcohol | 40 |
| Acetone | 30 |

The second composition of this invention was prepared by mixing the solutions (A₂) and (B₂). This composition was applied to the surface of a cylinder made of cast iron and then dried in the same manner as described in Example 1.

The cylinder thus treated gave the same effect as that set out in Example 1.

Example 3

An aqueous solution (A₃) was prepared from the following ingredients which are the same as those used in Example 1.

| | Parts by wt. |
|---|---|
| Polyacrylic acid (Aron A-20LL) | 2 |
| Colloidal silica (Snowtex-N) | 2 |
| Orthophosphoric acid | 3 |
| Water | 18 |

A second solution (B₃) was prepared from the following ingredients:

| | Parts by wt. |
|---|---|
| Tetra-iso-propoxytitanium | 1 |
| Iso-propyl alcohol | 35 |
| Methyl alcohol | 40 |

The third composition of this invention was prepared by mixing the solutions (A₃) and (B₃). This composition was applied to the surface of a cylinder made of an aluminium alloy and then dried in the same manner as described in Example 1. The cylinder thus treated gave the same effect as that set out in Example 1.

Example 4

An aqueous solution (A₄) was prepared from the following ingredients which are the same as those used in Example 1.

| | Parts by wt. |
|---|---|
| Polyacrylic acid (Aron A-20LL) | 2 |
| Colloidal silica (Snowtex-O) | 2 |
| Orthophosphoric acid | 5 |
| Water | 16.5 |

A second solution (B₄) was prepared from the following ingredients.

| | Parts by wt. |
|---|---|
| Tetrabutoxytitanium | 0.5 |
| Iso-propyl alcohol | 35 |
| Methyl alcohol | 40 |

The fourth composition of this invention was prepared by mixing solutions (A₄) and (B₄). This composition was applied to the surface of a cylinder made of cast iron and then dried by the same procedure described in Example 1.

The cylinder thus treated gave the same effect as that of Example 1.

Details of titanium compounds are given in the following:

(1) Diisopropoxy-bis(acetylacetonato)titanium is disclosed in Journal of American Chemical Society, vol. 79, 4346 (1957) and sold under trademark of "Tyzor AA" by E. I. du Pont de Nemours & Co. Inc. The formula is as follows:

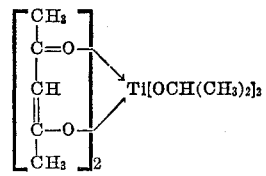

(2) Diisopropoxy - bis[2-(N,N-dihydroxyethylamino)-ethoxy] titanium is sold under trademark of "Tazor TE" by Du Pont Co., Inc. and is represented by the formula

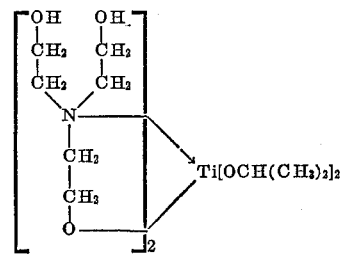

(3) Titanium - bis(acetylacetonato)diphenolate, titanium - bis(acetylacetonato)di - o - hydroxyphenolate and titanium-bis(ethyllactato)diphenolate are disclosed in Japanese patent publication No. 266,28/1967.

(a) A process of preparing titanium-bis(acetylacetonato)diphenolate is as follows: 284 parts of titanium tetraisopropoxide is dissolved in 500 parts of anhydrous benzene. To this solution is added, while stirring and cooling, a solution of 200 parts of acetylacetone in 200 parts of anhydrous benzene and the temperature of the solution is kept below 70° C. After the solution is heated under reflux at a boiling point of the solvent for 45 minutes, the isopropyl alcohol thus produced is removed by azeotropic distillation with benzene. The residue is dissolved in 300 parts of anhydrous benzene and to this solution is added a solution of 188 parts of phenol in 300 parts of anhydrous benzene. After the solution is heated under reflux at a boiling point of the solvent for 45 minutes, the isopropyl alcohol thus produced is removed by azeotropic distillation with benzene. There was obtained 415 parts of reddish orange powder titanium-bis(acetylacetonato)diphenolate. Yield 95%. M.P. 127~129° C.

Structural formula:

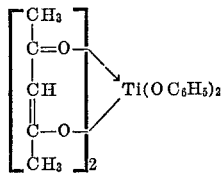

(b) Titanium-bis(acetylacetonato)di - o-hydroxyphenolate is prepared from titanium tetraisopropoxide (284 parts), acetylacetone (200 parts) and resorcin (220 parts) by the process similar to that described in (a), above.

Structural formula:

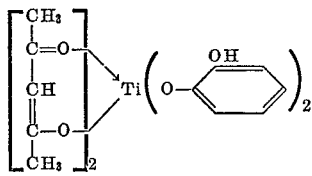

(c) Titanium-bis(ethyllactato)diphenolate is prepared from titanium tetraisopropoxide (142 parts), ethyl lactate (118 parts) and phenol (944 parts) by a process similar to that described above in (a).

Structural formula:

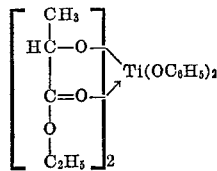

(4) Tetraalkoxytitanium compounds such as tetramethoxytitanium tetraethoxytitanium tetra - n - propoxytitanium, tetra-isopropoxytitanium and tetrabutoxytitanium are well known and are prepared by the reaction of titanium tetrachloride with sodium alkoxide.

(5) Bis(cyclopentadienyl)titanium diphenyl is disclosed in J. Am. Chem. Soc., vol. 76, 2278 (1954).

Formula:

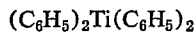

$(C_6H_5)_2Ti(C_6H_5)_2$

The above organic titanium compounds specifically described are referred to in the description supra.

We claim:
1. A composition for preventing the sticking of oily printing ink to a surface of a cylinder of an offset printing press, comprising a mixture of:
(a) 0.2–5 parts by weight of an aqueous solution containing a polyacrylic acid having a molecular weight of from about 7,000 to 200,000 and a solid content of about 25% by weight,
(b) 1–5 parts by weight of a colloidal silicic acid solution containing about 20% by weight silicic acid in water,
(c) 0.5–10 parts by weight of orthophosphoric acid,
(d) 0.1–2 parts by weight of an organic compound of titanium selected from the group consisting of diisopropoxy - bis(acetylacetonato)titanium, diisopropoxy - bis[2 - (N,N - dihydroxyethylamino)ethoxy] titanium, titanium - bis(acetylacetonato)diphenolate, titanium-bis(acetylacetonato)di - o - hydroxyphenolate, titanium-bis(ethyllactato)diphenolate, tetramethoxy-titanium, tetraethoxy-titanium, tetra-n-propoxy - titanium, tetra-iso-propoxy-titanium, tetrabutoxy-titanium and bis(cyclopentadienyl)titanium diphenyl,
(e) 40–75 parts by weight of an organic solvent selected from the group consisting of methyl alcohol, ethyl alcohol, isopropyl alcohol and acetone, and
(f) 58.2–3 parts by weight of water.

2. A composition according to claim 1 comprising a mixture of 1 to 5 parts by weight of an aqueous solution containing a polyacrylic acid, 1 to 5 parts by weight of a colloidal silicic acid solution, 3 to 10 parts by weight of orthophosphoric acid, 0.1 to 2 parts by weight of said organic compound of titanium, 40 to 75 parts by weight of said organic solvent and 58.2 to 3 parts by weight of water.

3. A composition according to claim 1 wherein the organic titanium compound is diisopropoxy-bis(acetylacetonato)titanium and the solvent is isopropyl alcohol.

4. A composition according to claim 1 wherein the organic titanium compound is titanium-bis(ethyllactato) diphenolate and the solvent is methyl alcohol.

5. A composition according to claim 1 wherein the organic titanium compound is tetra-iso-propoxytitanium and the solvent is methyl alcohol.

6. A composition according to claim 1 wherein the organic titanium compound is tetrabutoxytitanium and the solvent is a mixture of methyl alcohol and iso-propyl alcohol.

References Cited
UNITED STATES PATENTS
3,211,686  10/1965  Uber et al.

FOREIGN PATENTS
1,229,547  4/1971  Great Britain.

MELVIN GOLDSTEIN, Primary Examiner

U.S. Cl. X.R.
101—451, 465